July 12, 1932.  O. F. ROHWEDDER  1,867,378
FEEDING APPLIANCE FOR BREAD SLICING MACHINES
Filed May 13, 1929   3 Sheets-Sheet 1

Otto F. Rohwedder INVENTOR.
BY
Curtis Bush ATTORNEY

July 12, 1932. O. F. ROHWEDDER 1,867,378
FEEDING APPLIANCE FOR BREAD SLICING MACHINES
Filed May 13, 1929   3 Sheets-Sheet 2
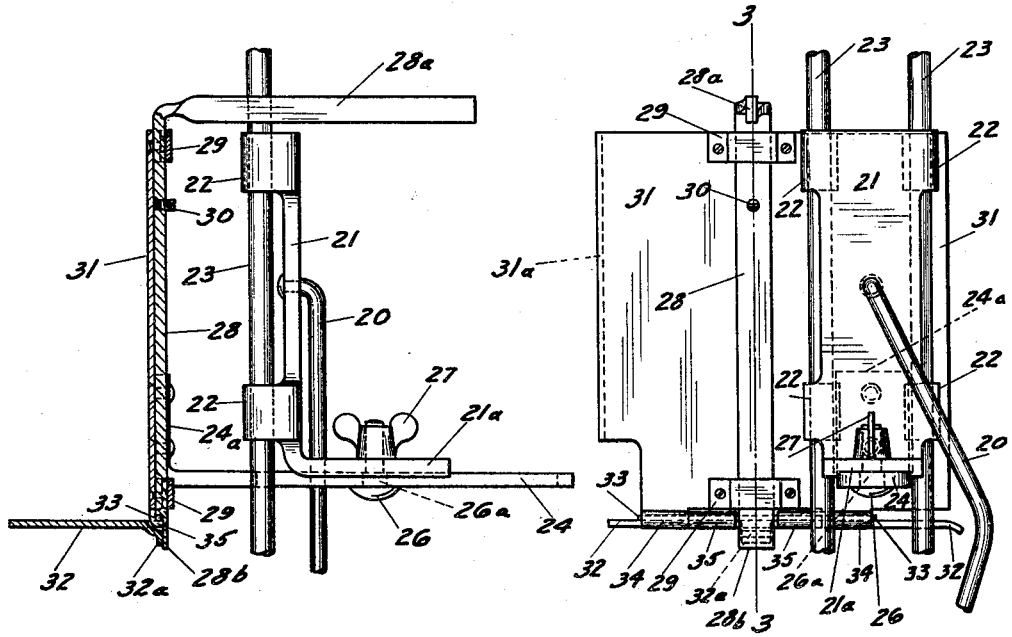
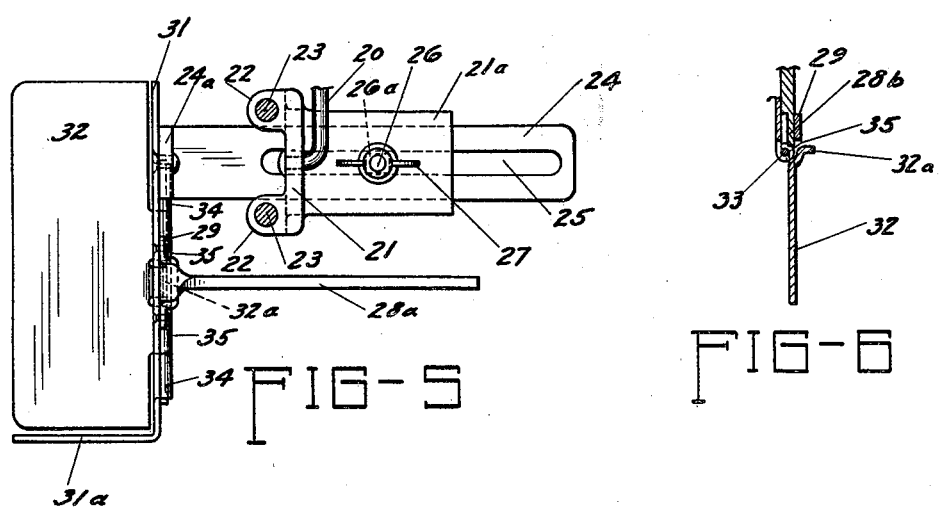
Otto F. Rohwedder INVENTOR.
BY
Curtis Bush ATTORNEY July 12, 1932.   O. F. ROHWEDDER   1,867,378

FEEDING APPLIANCE FOR BREAD SLICING MACHINES

Filed May 13, 1929   3 Sheets-Sheet 3

INVENTOR
Otto F. Rohwedder
BY
Evans & McCoy
ATTORNEYS

Patented July 12, 1932

1,867,378

UNITED STATES PATENT OFFICE

OTTO F. ROHWEDDER, OF DAVENPORT, IOWA, ASSIGNOR TO MAC-ROH SALES & MFG. COMPANY, OF DAVENPORT, IOWA, A CORPORATION OF DELAWARE

FEEDING APPLIANCE FOR BREAD SLICING MACHINES

Application filed May 13, 1929. Serial No. 362,574.

This invention relates to bread slicing machines and particularly to a feeding appliance for progressively feeding loaves of bread to the slicing blades.

One of the objects of the present invention is to provide new and novel means for feeding bread to a slicing machine wherein the loaves can be rapidly and progressively sliced.

Another object is to provide a bread slicing machine with an improved table loading device which deposits a loaf of bread on the feed table immediately after a preceding loaf has been sliced.

Another object is to provide a bread slicing machine with a reciprocable table loading device so synchronized with the means which moves the bread through the slicing blades, that a loaf of bread is lowered into slicing position immediately after the preceding loaf has been sliced.

A further object is to provide a bread slicing machine with an improved feeding means which eliminates manual handling of the bread.

With the above and other objects in view the present invention may be said to comprise the feeding appliances illustrated in the accompanying drawings to be hereinafter described, particularly set forth in the accompanying claims, together with such variations and modifications thereof as will be apparent to one skilled in the art to which the present invention appertains.

In the drawings which illustrate a suitable embodiment of the present invention, Fig. 1 is a side elevation of a bread slicing means having the feeding appliance incorporated thereon, the driving means for the blades being removed for clearness of illustration.

Fig. 3 is a vertical section of the feeding appliance taken on the line 3—3 of Fig. 4.

Fig. 4 is an enlarged side elevation of the feeding appliance.

Fig. 5 is a plan view of the feeding appliance shown in Fig. 4.

Fig. 6 is a fragmentary sectional view similar to the lower portion of Fig. 3 showing the bread support in discharging position.

Figure 1:
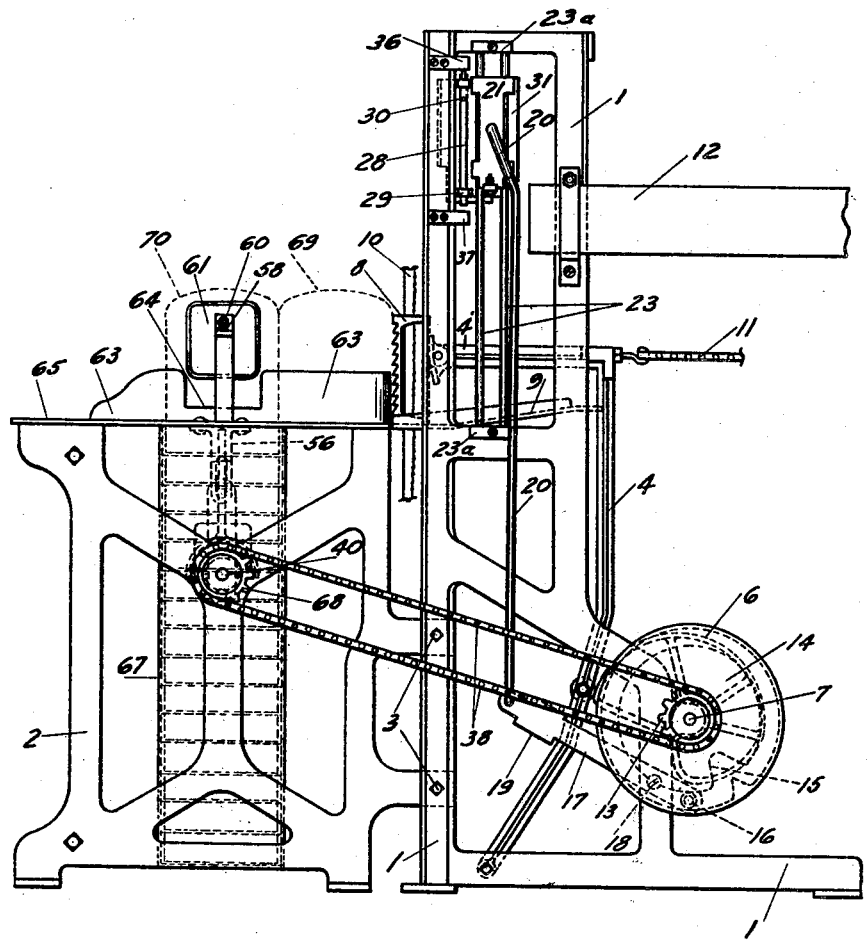

The table loading device of the present invention is particularly adapted for use with bread slicing machines of the types shown in my co-pending applications Serial Nos. 249,612 and 290,503, filed Jan. 26, 1928 and July 5, 1928 respectively, and is an improvement on the feeding device shown in my co-pending application Serial No. 347,838 filed March 18, 1929. It is to be understood, however, that this invention is equally adaptable to other types of slicing machines.

Since the means for operating the cutting blades are shown and described in detail in the above co-pending applications, the driving means is omitted and the blades are only partially shown in the drawings for clearness of illustration.

Referring to the accompanying drawings in which like numerals refer to like parts throughout the several views, the slicing machine, in general, comprises side frames 1 provided with pusher arms 4 pivoted thereto at their lower ends, their upper ends being formed with forwardly projecting extensions 4'. A slotted pusher head 8 is attached to the foremost ends of the extensions 4' and is adapted to be moved forwardly and rearwardly over a tiltable feed table 9 to feed the loaf of bread supported thereby to a number of aligned reciprocable cutting blades 10. As viewed in Fig. 1, the pusher head 8 is in its extreme forward position and has just moved a sliced loaf of bread 69 through the cutting blades 10 onto a delivery table 65, which is in horizontal alignment with the feed table 9. The delivery table 65 is supported on a subframe 2 which is secured to the main side frames 1 by suitable bolts 3.

Figure 2:
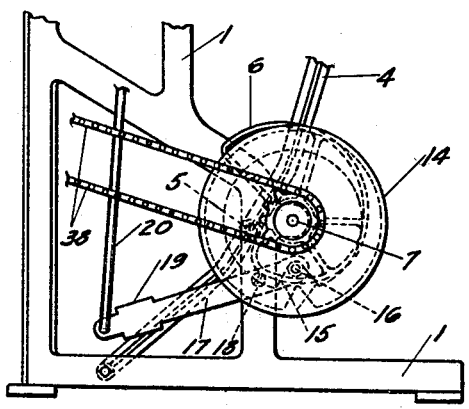
Fig. 2 is a fragmentary side elevation of the driving mechanism for the pusher and feeding appliance, showing the position of the same when the appliance is in bread discharging position.
Figure 7:
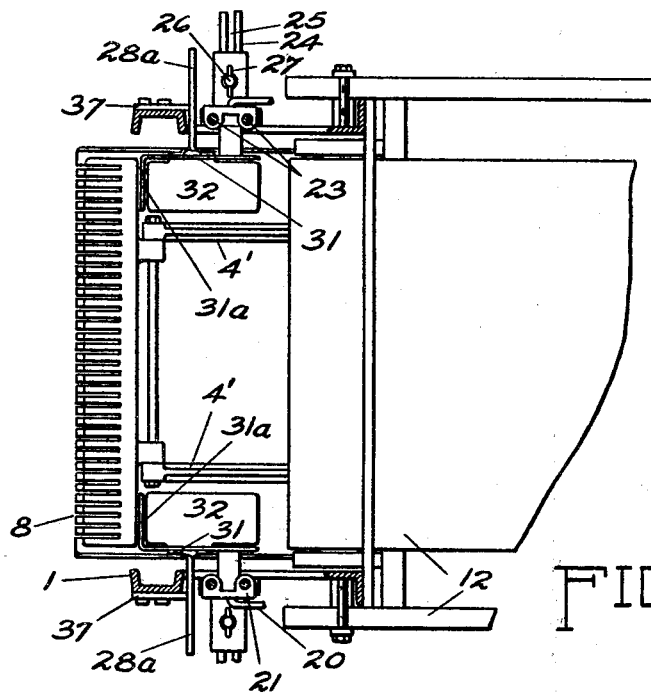
Fig. 7 is a partial plan view of the slicing machine shown in Fig. 1, portions of the supporting frame being broken away and shown in section.
Figure 8:
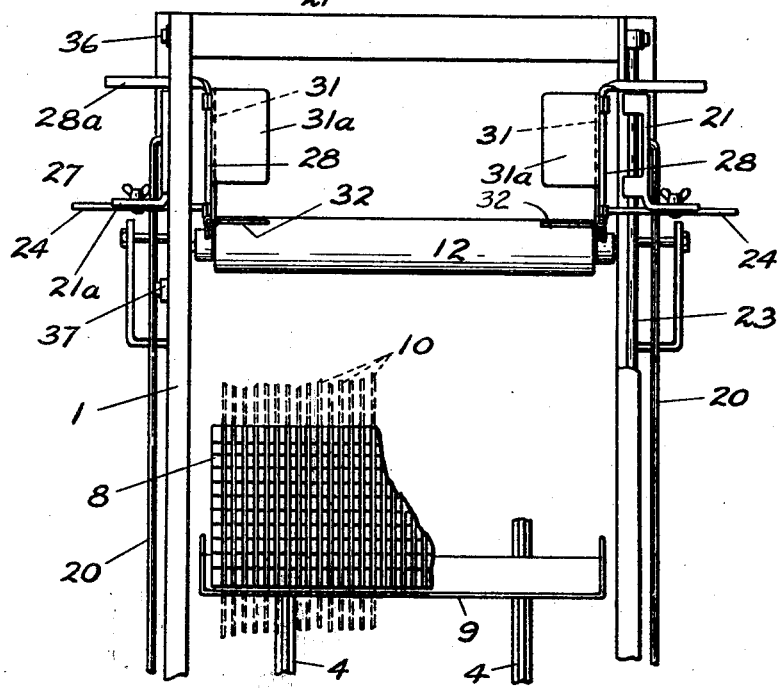
Fig. 8 is a partial front elevation of the slicing machine, the discharge table and packaging apparatus being omitted.

The pusher levers 4 are pivoted forwardly and rearwardly by means of a suitable cam 6, shown in broken outline in Figs. 1 and 2, which is rigidly mounted on a rotatable shaft 7, the cam 6 being adapted to contact with a cam follower 5 mounted on one of the pusher levers 4. It is obvious that as the shaft 7 rotates, the cam follower 5 continuously contacts with the cam 6 and causes the pusher head 8 through the medium of the levers 4 to move back and forth over the feed table 9 to progressively feed loaves of bread to the cutting blades 10. As described in the previously mentioned co-pending applications, the pusher arms 4 may be retracted to their rearmost position by gravity, assisted by a tension spring or any other desirable means. The position of the levers 4 in their rearmost position is clearly illustrated in Fig. 2.

In bread slicing machines used heretofore it has been the practice to place the bread to be sliced, by hand directly on the feed table. This prior practice is very slow because of the manual placing of the bread and is dangerous since oftentimes the operator has severely cut his hands and fingers by contact with the cutting blades. This practice furthermore is unsanitary since it is necessary to handle all the bread to be cut, by hand.

The present invention proposes to overcome these disadvantages by providing an efficient automatic feeding appliance for placing the bread to be sliced in the correct slicing position on the feed table.

The bread to be sliced is preferably conveyed to the machine by a suitable conveyor 12 (shown diagrammatically in Fig. 1). One desirable type of conveyor is clearly shown and described in my co-pending application Serial No. 347,838, so will not be described in detail herein. The bread is progressively fed to the feeding appliance which will now be described, which appliance lowers the bread to a position adjacent the feed table 9 and discharges the same thereon.

The feeding appliance comprises two spaced elevator devices which are adapted to be vertically reciprocated at the sides of the machine. Each device preferably comprises a vertical slide plate 21 having aligned upper and lower vertically bored lugs or guides 22 thereon. A pair of parallel rods 23 are secured in a vertical direction outwardly of the feed table 9 to each side frame 1 by suitable clamps 23a, each pair of rods 23 having a side plate 21 mounted thereon. As shown in Figs. 3 and 5 the rods 23 extend through the aligned lugs or guides 23, so that the plate 21 can be reciprocated thereon.

Each plate 21 is reciprocated by a depending link 20 which is pivoted at its lower ends to one end of a crank 17, the crank 17 being pivoted intermediate its ends as indicated at 18 to the frame 1. The other end of the crank 17 as shown in broken outline Figs. 1 and 2 is provided with a cam follower 16 which is guided in a passageway or groove formed in a suitable cam 14 that is rigidly secured to the shaft 7. The cam groove is formed with an indentation 15 therein so that the cam follower 16 can move into the same and thereby actuate the crank. A weight 19 may be provided on the cranks 17 if desired to accelerate the downward movement of the feeding appliance. The cams 14 for the feeding appliance and the cam 6 for the pusher levers 4 are so arranged that the crank 17 is actuated only when the pusher is in its retracted position as shown in Fig. 2. The action of the cams however will be later described in detail.

Each side plate 21 is formed with an outwardly extending horizontal bracket or extension 21a of inverted channel form which slidably receives an adjustable supporting bar 24. The bar 24 is provided with a longitudinal slot 25 and is secured to the extension 21a by means of a bolt 26 which extends through the slot 25 and extension 21a and is provided with a thumb nut 27, the bolt 26 preferably being provided with a squared shank portion 26a which closely nests within the slot 25. It is obvious that by loosening the thumb nut 27, the supporting bar 24 can be adjusted horizontally to accommodate loaves of different lengths.

The supporting bar 24 of each device is formed with an upturned flange 24a at its inner end to which a flat vertical plate 31 is secured by rivets or other suitable securing means. Referring to Fig. 4 in particular, the lower edge of the plate 31 is formed with spaced extensions 34 which are rolled to form bearings or pin supporting portions through which a horizontal pin 33 extends. The pin 33 pivotally or hingedly supports a bed plate 32 which is provided with rolled hinge portions 35 through which the pin 33 also extends, the portions 34 of the plate 31, the hinge portions 35 of the bed plate 32 and the pin 33 thereby providing a piano type of hinge.

The bed plate 32 of each device supports one end of a loaf of bread and is adapted as the device reaches its lowermost position, to swing downwardly so that the bread can fall by gravity onto the feed table 9.

A simple means for holding the bed plate 32 in its horizontal position during the upper portion of the movement of the device, is provided which comprises a slidable latch bar 28. The latch bar 28 is vertically positioned intermediate the vertical edges of the plate 31 and is guided by spaced U-shaped guide members 29 that are secured to the plate 31. A screw 30 is preferably threaded through the latch bar 28 to frictionally bear against the face of the plate 31 to prevent the latch bar from sliding too easily.

The lower end of the latch bar 28 is formed with a continuation or finger portion 28b of reduced thickness which when the bar is in its normal operative position abuts against a right angled extension 32a formed integral with the bed plate 32 between the hinge portions 35, to hold the bed plate 32 in horizontal position. It is clearly obvious that in this position, the finger 28b of the latch bar 28 by reason of its engagement with the extension 32a of the bed plate 32, prevents the bed plate from swinging from a horizontal to a vertical position.

The upper end of the latch bar 28 is provided with a right angled stop engaging portion 28a which is adapted to engage upper and lower stop members 36 and 37 which are secured to the frame 1. When each feeding appliance reaches its lowermost bread discharging position, the stop engaging portion 28a engages the lower stop 37 and causes the latch bar 28 to slide upwardly and move to the position shown in Fig. 6, with the result that the finger extension of the bar 28 is disengaged from the bed plate extension 32a so that the bed plate 32 is free to pivot.

The side plate 32 is preferably formed with a right angled flange 31a at its forward edge of substantially the same width as the bed plate 32 to prevent the bread as it is discharged thereonto from moving too far forwardly.

The feeding appliance comprises two of the elevator devices just described which are horizontally aligned to support the loaf of bread as it is discharged thereonto from the conveyors, and which are simultaneously reciprocated at the same speed.

Each loaf of bread as it is sliced is moved onto the delivery table 65 between a pair of spaced guides 63 which holds the slices in contiguous relationship until they can be wrapped. The sliced loaf may be bodily removed from the table 65 and wrapped, or if desired the loaf may be automatically placed in trays by the device shown in my pending application of even date and partially shown in this application.

As briefly shown in Fig. 1, this packing device comprises a pair of spaced presser pads 61 (only one being shown) which are secured by nuts 60 to actuating arms 58 that are pivoted to supports 56. These arms 58 are actuated by suitable mechanism which is operated by a rotatable shaft 40 having a sprocket 68 secured thereto, the sprocket being rotated by a link chain 38 and a sprocket 13 mounted on the cam shaft 7. A plurality of trays are fed upwardly through a chamber 67 to a position intermediate the guides 63. The guide 63 is formed with a notch or recess 64 so that the presser pad 61 can be moved thereover.

The packing device just described is so timed that as a loaf of bread is moved to the position indicated at 70 by the succeeding loaf 69, the presser pads 61 slightly compress the loaf and lower it into the tray. The tray or holder having the sliced bread positioned therein is then removed to a suitable wrapping machine where a wrapper is positioned around the bread and holder.

In the operation of the feeding appliance just described, the pair of elevator devices remain in their uppermost position during the forward and rearward motion of the pusher and only drop to bread discharging position as the pusher nears the end of its rearward movement. The bed plates 32 of the devices remain in horizontal position while they are at their uppermost position and also receive a loaf of bread from the conveyor 12 while in such position. As the pusher 8 nears the end of its rearward movement, the cam followers 5 on the levers 4 gradually move into the depressions in the cams 14 with the result that the crank 17 rocks downwardly. The downward movement of the forward end of the cranks 17 causes the elevator devices to slide downwardly on the guide rods 23. As the devices approach their lowermost position, the stops 37 engage the projecting upper ends 28a of the latch bars 28 and cause the latch bars 28 to remain stationary with respect to the side plates 31 thereby disengaging from the bed plate projections 32a so that the bed plates 32 can pivot and allow the bread carried thereby to drop by gravity onto the feed table 9 in the correct slicing position.

The cam followers 5 then move out of the depressions 15 as the pusher 8 starts to move forwardly to feed the loaf to the blades 10, and thereby causes the elevator devices to move upwardly with the bed plates 32 still in their pivoted positions as shown in Fig. 6. As the elevator devices near the upper end of their stroke, the upper stop fingers 36 engage the extending portions 28a of the latch bars 28 and hold the same stationary as the elevator devices continue their upward movement with the result that the extensions 28b of the latch bars 28 engage the pivoted bed plates 32 and swing them to their aligned horizontal positions, the extensions thereby positioning themselves against the bed plate projections 32a and holding the bed plates 32 in such horizontal bread receiving position. The operation just described is then repeated.

It is to be noted that the cams 14 are designed to provide rapid movement of the elevator devices so that the pivoted bed plates 32 will not interfere with the operation of the pusher 8.

It is to be further noted that the pusher 8 and bread carriers or elevator devices are so synchronized that loaves of bread can be progressively fed to the slicing blade in substantially a continuous operation.

The feeding mechanism just described may be used in connection with mechanical conveyors which discharge the bread thereon, or the bread may be manually placed upon the carriers if desired, without exposing the operator to danger from the cutting blades.

In the claims the appliance will be referred to as a charging apparatus.

It is to be understood, however, that the type of feeding appliance shown, is presented for purposes of explanation and illustration, and that various modifications of the invention described can be made without departing from the spirit and substance of the broad invention, the scope of which is commensurate with the appended claims.

What I claim is:

1. In a bread slicing machine of the class described, having a feeding table, a charging apparatus comprising guide-bars secured to the machine at each side thereof and above the feeding table, slides mounted upon the guide-bars, supporting bars secured to the slides and movable therewith, carriers united to the supporting bars, pivoted bread supports mounted on said carriers, a drive shaft, cams mounted upon the drive shaft, pivoted actuating levers having certain ends connected to the carriers and the opposite ends adapted to engage and be positively driven by the cams, and means for permitting said bread supports to pivot as they approach the lower end of their travel.

2. In a bread slicing machine of the class described having a frame and a feeding table mounted thereon, a charging apparatus comprising guide-bars secured to the frame of the machine at each side thereof and above the feeding table, slides mounted upon the guide-bars, supporting bars secured to the slides and movable therewith, carriers united to the supporting bars, a drive shaft, cams mounted upon the drive shaft, levers pivoted in the frame, said levers being weighted at certain ends and having their opposite ends engaging the cams, and adapted to be positively actuated thereby and links connecting the weighted ends to the carriers.

3. In a bread slicing machine of the class described having a supporting frame and a feeding table mounted thereon, a charging apparatus comprising guide-bars secured to the frame of the machine at each side thereof and extending above the feeding table, slides mounted upon the guide bars, supporting bars secured to the slides and movable therewith, carriers united to the supporting bars, each carrier comprising a wall with a bed-plate hinged thereto, a lug formed upon each bed-plate adjacent the hinge, a latch bar slidingly mounted upon each carrier wall adapted to engage the lug of the bed-plate and secure the bed-plate in horizontal position when the carrier is in raised position, and means for positively driving the slides reciprocatingly upon the guide-bars.

4. In a bread slicing machine of the class described having a supporting frame and a feeding table mounted thereon, a charging apparatus comprising guide-bars secured to the frame of the machine at each side thereof and extending above the feeding table, slides mounted upon the guide-bars, supporting bars secured to the slides and movable therewith, carriers united to the supporting bars, each carrier comprising a wall with a bed-plate hinged thereto, a lug formed upon each bed-plate adjacent the hinge, a latch bar slidingly mounted upon each carrier wall adapted to engage the lug of the bed-plate and secure the bed-plate in horizontal position when the carrier is in raised position, and to release the bed-plate when the carrier is driven downward to a predetermined point, and means for positively driving the slides reciprocatingly upon the guide-bars.

5. In a bread slicing machine of the class described having a supporting frame and a feeding table mounted thereon, a charging apparatus comprising guide-bars secured to the frame of the machine at each side thereof and extending above the feeding table, slides mounted upon the guide-bars, supporting bars secured to the slides and movable therewith, carriers united to the supporting bars, each carrier comprising a wall with a bed-plate hinged thereto, a lug formed upon each bed-plate adjacent the hinge, a latch bar slidingly mounted upon each carrier wall, each latch bar having its upper end bent and extended outward at an angle to its body, upper and lower detents secured to the frame in the paths of the latch bar extensions, and means for positively driving the slides reciprocatingly upon the guide-bars.

6. In a bread slicing machine of the class described having a supporting frame and a feeding table mounted thereon, a charging apparatus comprising guide-bars secured to the frame of the machine at each side thereof and extending above the feeding table, slides mounted upon the guide-bars, supporting bars secured to the slides and movable therewith, carriers united to the supporting bars, each carrier comprising a wall with a bed-plate hinged thereto, a lug formed upon each bed-plate adjacent the hinge, a latch bar slidingly mounted upon each carrier wall, each latch bar having its upper end bent and extended outward at an angle to its body, upper and lower detents secured to the frame in the paths of the latch bar extensions, a drive shaft, cams mounted upon the drive shaft and actuating levers pivoted in the frame, links connecting certain ends of said levers to the carriers, the opposite ends being adapted to engage and be positively driven by the cams.

7. In a bread slicing machine of the class described having a supporting frame and a feeding table mounted thereon, a charging apparatus comprising guide-bars secured to the frame of the machine at each side thereof and extending above the feeding table, slides mounted upon the guide-bars, supporting bars secured to the slides and movable therewith, carriers united to the supporting bars, each carrier comprising a wall with a bed-plate hinged thereto, a lug formed upon each bed-plate adjacent the hinge, a latch bar slidingly mounted upon each carrier wall adapted to engage the lug of the bed-plate and secure the bed-plate in horizontal position when the carrier is in raised position, a drive shaft, cams mounted upon the drive shaft, actuating levers pivoted in the frame, and links connecting certain ends of said levers to the carriers, the opposite ends being adapted to engage and be positively driven by the cams.

8. In a bread slicing machine having cutting blades and a feed table, a reciprocable bread supporting member having a pivoted support for discharging a loaf of bread to be sliced onto said feed table, a crank lever pivoted intermediate its ends, a link connecting said supporting member with one end of said lever, means for actuating the other end of said lever whereby said bread supporting member may be reciprocated, and means for tripping said pivoted support at one end of the stroke of said member to discharge the loaf carried thereby onto said feed table.

9. In a bread slicing machine, having cutting blades and a feed table, a reciprocable bread supporting member having a pivoted support for discharging a loaf of bread to be sliced onto said feed table, a crank lever pivoted intermediate its ends, a link connecting said supporting member with one end of said lever, a rotatable cam engageable with the other end of said lever, whereby said bread supporting member may be reciprocated upon rotation of said cam, and means for tripping said pivoted support at one end of the stroke of said member to discharge the loaf carried thereby onto said feed table.

10. In a bread slicing machine having a feed table, a vertically reciprocable table charging device for depositing a loaf of bread onto said table comprising a side plate, a bed plate hinged to said side plate, and a latch member slidably movable relative to said side plate, and a latch member slidably movable relative to said plate adapted to engage said bed plate and hold the same in horizontal position, an upper stop member and a lower stop member, the upper end of said latch being bent outwardly whereby when said table charging device approaches the lower end of its stroke, said lower stop member engages said outwardly bent portion of said latch to disengage said latch from said bed plate to permit said bed plate to pivot, and when said device approaches the upper end of its stroke said upper stop member engages said outwardly bent portion to move said latch into engagement with said bed plate and swing the same to its horizontal position.

In testimony whereof he affixes his signature.

OTTO F. ROHWEDDER.